Patented Mar. 9, 1937

2,073,340

UNITED STATES PATENT OFFICE 2,073,340

METHOD OF PACKING WHOLE TOMATOES, ETC.

Edward C. Eberts, Indianapolis, Ind.

No Drawing. Application January 4, 1936, Serial No. 57,489

4 Claims. (Cl. 99—186)

The object of my invention is to produce a commercial package containing several fruits, such as tomatoes, in such condition that they may be preserved for long periods and, when extracted from the package, will be substantially whole and so firm that they may be sliced or quartered to be in condition comparable with the raw fruit so sliced or quartered.

My improved product is produced in the following manner:

Having noted that the axial diameter of fruits like tomatoes bears a substantially uniform ratio to the diameter at right angles to the axis, I first select two or more transverse diameters as commercially acceptable fruit sizes and I then select or have fabricated, cans having internal diameters but slightly exceeding the selected fruit diameters and having heights (axial dimensions) approximating (slightly plus or minus) three times that of the average axial dimensions of the fruits, and the fruits are packaged in the appropriate cans, i. e., the cans having transverse diameters approximating the transverse diameters of the fruits.

From the available supply of fruits, I select the firmer fruits, including those which are a trifle underripe even to the extent of showing some green at the stem end. These last fruits are detrimental in the production of catsup or chili sauce where the ultimate product is subject to a color test, i. e., a certain degree of redness, but which, as is well known to the average housekeeper, are considered more acceptable in the preparation of salads because of their firmness.

The selected fruits having been stemmed and cleaned, are scalded in the usual manner and carefully peeled, and are then introduced, whole, into the appropriate sized cans, three to a can and the voids filled with tomato juice. The filled cans are then passed through a vacuum box, in the usual manner to become exhausted of a part of the naturally occluded air and raised to a temperature of about 140° F., i. e., while in the vacuum chamber for a period of about five minutes, they are subjected to a temperature of from 210° to 212° F.

The sealed cans are thereupon placed upon their sides in suitable crates and thereupon subjected to a heating medium considerably under 212° F. but above 175° F., while quiescent, for a period sufficiently long to raise and maintain the contents of the cans throughout to a temperature of 175° F. for a period of fifteen minutes or more. It is found that this period may be extended to as much as forty-five minutes without deleterious effect upon the fruits.

The cans, after being so heated and while still quiescent, i. e., without substantial agitation of the contents, and while still on their sides, are cooled to atmospheric temperatures so that the fruit will regain a firmness which it has lost during the heating period.

Thereafter, the cans can be handled for storage and shipment in the usual manner without a special care against jarring and without breaking the fruit as a result of the handling.

Upon the opening of the cans thus treated, the contents will be found to be whole and firm and to have been thoroughly sterilized so as to keep for indefinite periods so long as sealed. The fruit thus packaged may be sliced or quartered as readily as the raw fruit without becoming broken down and will be found to have a taste and texture closely approximating the raw fruit.

I have found a convenient means for the final heat treatment of the product to be as follows:

An open vat containing water at approximately 190° F. is arranged to receive, conveniently from an overhead trolley system, a multiplicity of groups (conveniently two each, one above the other) of crates, in which the cans are arranged on their sides. This vat is arranged to receive a continuous supply of hot water from a heating tank which is itself supplied, by a suitable pump from the vat, in such manner that there is a continuous circulation of water at approximately 190° F. through the vat around the cans. The crates, having been in the heating vat for a sufficient length of time to permit the contents of the cans to be raised to the desired temperature of 175° F. and maintained for the above specified period, are removed and their places taken by freshly charged crates.

It is important that the cans, from the time the tomatoes are placed therein until they are cooled, be subjected to the least possible agitation or jarring, and it is doubly important that, during the final heating period, during which the fruit becomes very materially softened as the result of the application of the heat, they be quiescent up until the time the cooling has proceeded to a point where firmness is again attained. It is also important that none of the fruit be subjected to the weight of superimposed fruit.

It is for this reason that the cans, during the heating stage where softening occurs, rest upon their sides, because in that position, no single fruit is subjected to the weight of an adjacent fruit.

It is also important that the transverse diameter of the can closely approximates the transverse diameter of the fruit so that during transportation, the freedom of movement of the fruit within the can is substantially restricted.

I have found, in practice, that the most acceptable results are obtained where the can is so proportioned as to have a capacity of three fruits, for the reason that the one or two fruit can is squatty and ungainly in appearance, and the can capable of holding more than three fruits is too tall for convenient handling. A three-fruit capacity can also better meet the needs of the average householder than a can of different capacity.

By "cylindrical container", I mean a container having a substantially flat top and bottom and an axially extending connecting wall which, when the container is placed so as to rest on that wall, affords for the lower-region contents, upwardly divergent portions.

I claim as my invention:

1. The method of packaging tomatoes which comprises the step of subjecting a sealed container, containing two or more whole fruits, while quiescent and on its side, to a temperature substantially below 212° F. for a period of time sufficient to raise the temperature of the fruit to or above 175° F. for a period of not less than fifteen minutes, and to the exclusion of a higher heat treatment.

2. The method of packaging tomatoes which comprises the step of subjecting a sealed container, containing two or more whole fruits with transverse diameters closely approximating the container diameter and in axial arrangement, while quiescent and on its side, to a superatmospheric temperature sufficient to raise the fruit to a temperature of 175° F. to 190° F. for a period of not less than fifteen minutes.

3. The method of packaging tomatoes which comprises the step of peeling firm whole tomatoes of substantially uniform diameter; the step of placing a plurality of peeled fruit in axial arrangement in a container of approximately the same diameter and a length approximating the axial extent of the fruit group; the step of exhausting a part of the occluded air and raising the temperature to less than a substantial fruit softening temperature; the step of sealing the container; the step of subjecting the sealed container while quiescent and on its side to a superatmospheric temperature sufficient to raise the fruit to and maintain the fruit at a temperature of at least 175° F. for a period of at least fifteen minutes; and the step of cooling the container while quiescent and on its side until the fruit has regained firmness.

4. The method of packaging tomatoes which comprises the step of peeling firm whole tomatoes of substantially uniform diameters; the step of placing a plurality of peeled fruit in axial arrangement in a container of approximately the same diameter and a length approximating the axial extent of the fruit group; the step of sealing the container; the step of subjecting the sealed container while quiescent and on its side to a superatmospheric temperature sufficient to raise the fruit to and maintain the fruit at a temperature of at least 175° F. for a period of at least fifteen minutes; and the step of cooling the container while quiescent and on its side until the fruit has regained firmness.

EDWARD C. EBERTS.